Dec. 5, 1933.  D. R. MURRAY  1,937,582
AUTOMATIC MIXING DEVICE
Filed Jan. 3, 1933
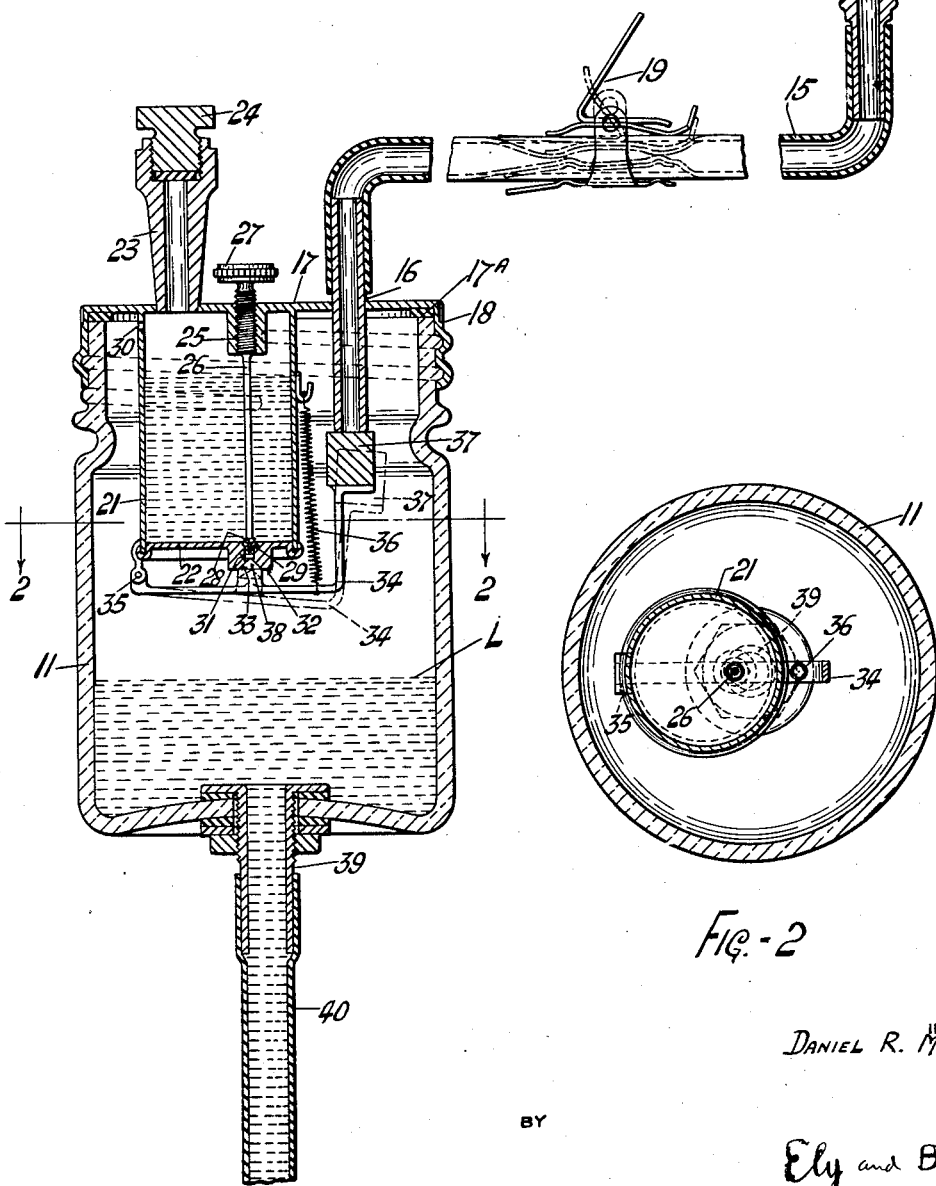
INVENTOR
DANIEL R. MURRAY
BY
Ely and Barrow
ATTORNEYS Patented Dec. 5, 1933

1,937,582

UNITED STATES PATENT OFFICE 1,937,582

AUTOMATIC MIXING DEVICE

Daniel R. Murray, Cleveland, Ohio

Application January 3, 1933. Serial No. 649,880

12 Claims. (Cl. 299—84)

This invention relates to automatic mixing devices, and more particularly to devices for mixing and proportioning liquids forming admixtures with water such as are used in connection with syringes and the like.

The conventional way of mixing antiseptic or medicinal chemicals with water, in use in the home, is to provide a measured quantity of water in a container, such as a rubber hot water bottle and the like, and then a measured quantity of such admixture is added to the water. The resulting admixture is then placed in such a position, with reference to the point of discharge, that the admixture will flow by gravity through a flexible rubber hose to a syringe or the like.

In this type of device it is necessary to add a measured amount of antiseptic solution, or chemicals, each time the container is filled and there is no means by which the mixing may be accomplished as a continuous process.

I have discovered that a continuously operating automatic mixing device may be provided, which, in operation, requires only the filling of a solution or chemical reservoir, the setting of an adjusting means, and the continuous mixing operation is started by turning on a supply of water under pressure to which the device is fastened. The mixing operation, supplying predetermined proportions, continues as long as the water continues to flow and there is supply of the solution or chemicals in the reservoir.

It, therefore, is an object of this invention to provide an automatic means for mixing a liquid with water supplied under pressure in such a manner, that proportions of water and the liquid mixed therewith may be determined in advance of the mixing operation, and such proportions will remain constant regardless of the volume of water or pressure thereof supplied to the device.

Another object is to provide a device to accomplish the above objects, which is small, compact and easily attachable to a source of water under pressure, and which is simple of operation and construction and may be quickly and easily adjusted.

Another object is to provide an automatic mixing device in which the mixed liquids will be under pressure, so that the admixture may be conducted a considerable distance from the mixing device, for use in various sanitary and medicinal applications. This feature permits the mixture to be given a swirling motion, which is considered a very valuable feature in many uses.

Still another object is to provide a device of the nature described, which operates entirely independently of gravity, so that various applicators connected to tubing leading from the mixing device may be used in any desired position, a uniform pressure being supplied at any position.

The above and other objects of this invention are accomplished in an illustrative embodiment of the invention, as disclosed in the accompanying drawing, in which:

Fig. 1 is a central vertical section through the center of a mixing device, while Fig. 2 is a section taken on the line 2—2 of Fig. 1.

The embodiment of the invention, herein shown, is especially adapted for use in connection with a syringe or an irrigator, in which the application of the mixed liquids takes place at a point some distance from the tap supplying water under pressure.

In the drawing, 11 represents a cylindrical glass mixing reservoir, while water, under pressure, is supplied thereto from a water tap or faucet 12, to which is secured a head 13, by means of a rubber gasket 14, which is forced over the end of the faucet 12. A flexible rubber tube 15 is fitted over the lower end of the head 13, and connects it with an inlet tube 16, secured to the top plate 17 of the mixing reservoir 11, and extends into the reservoir for some distance, as shown in Fig. 1. The top plate 17 is provided with a downwardly extending flange 18, having threads mating with similar threads formed on the top of the sides of the reservoir 11, so that the top plate is screw threadedly mounted thereon permitting it to be quickly attached and removed, while a gasket 17—A, on the top of the mixing reservoir 11, permits the top plate 17 to be tightly secured thereto. A clip 19 is provided on the flexible tube 15 for the purpose of clamping together the sides, as shown in the dotted lines in Fig. 1, to shut off the water from the mixing reservoir 11. A spring pressed relief valve 20, normally closed, is provided on the side of the head 13, and opens when a predetermined pressure is reached in the flexible tubing 15, to prevent the breaking of the tubing by the excessive pressure of the water.

A cylindrically shaped solution reservoir 21, having a bottom wall 22, depends from the bottom of the top plate 17 and receives a filling tube 23 having a hexagonal cap 24 screw threadedly mounted at the top thereof. A hollow boss 25, extending downwardly from the bottom of the top plate 17 is provided internally with screw threads cooperating with screw threads on the top of a valve stem 26 having a flat disc 27, permitting the valve stem to be easily turned in the boss 25. The screw threads on the top of the valve stem 26 and the cooperating threads on the internally threaded boss 25 are preferably made so that no air can enter the solution reservoir 21 therethrough. A small aperture 30 constituting a vent for the admission of air into the top of the solution reservoir 21 permits liquid contained therein to flow out. The lower end of the valve stem 26 is provided with a conical valve head 28, which seats in a ported valve seat 29, formed at the top of a channel 31 in a boss 32 extending downwardly from the bottom wall 22 of the solution reservoir 21, the bottom of the channel 31 is tapered outwardly at 33 for a purpose to be explained later.

The flow of the liquid out of the bottom of the solution reservoir 21 through the channel 31, in addition to being controlled in an obvious manner by the valve stem 26, is controlled by a lever 34 pivotally secured to the bottom of the solution reservoir 21 as at 35, and comprises a horizontally extending and a vertically extending part, as shown in Fig. 1. A coil spring 36, secured to the side of the solution reservoir and to the horizontally extending part of lever 34, normally sustains the lever 34 in the closed position shown in the full lines in Fig. 1. The upper end of the vertically positioned part of the lever 34 is provided with a head 37 adapted to fit against the lower end of the tube 16 conducting water under pressure into the top of the mixing reservoir 11, while the horizontally extending part of the lever 34 is provided with a somewhat conical shaped head 38 adapted to seat in the outwardly tapered part 33 of the channel 31 in the boss 32 for controlling the flow of liquid therefrom.

A discharge tube 39 is suitably secured to the bottom wall of the mixing reservoir 11, while a flexible rubber tube 40 is mounted over the lower end of the discharge tube 39. It has been found that the best results are obtained by having the inlet tube 16 about one-half the diameter of the discharge tube 39, to assure the proper pressure and to keep the mixture at a proper level within the mixing reservoir 11. The mixing device shown is intended to be used to supply a mixture of water with some other liquid, which is to be used in connection with a syringe, or the like, for various purposes. The syringe or other injecting device may be suitably secured to the lower end of the flexible tube 40 and may be at a considerable distance from the mixing device.

The mixing device herein shown is not to be considered as being limited to the use mentioned, as it has been found that it may be conveniently used in many commercial processes, such as mixing various chemicals, paints and the like. In certain instances, when certain heavy liquids are used, additional pressure may be required to assure a proper flow of the liquids. In such cases compressed air may be used and is admitted at the top of the mixing reservoir 11.

The operation of the device, in connection with a syringe or other injector means, is as follows. The hexagonal cap 24 is first unscrewed from the filling tube 23 and the admixture or solution to be mixed with the water is poured therein, and the cap 24 is screwed down. Then the disc 27 on the valve stem 26 is adjusted to lower or raise the valve head 28 to permit the proper flow of liquid therefrom, in predetermined proportions with the water. The head 13 is then placed over the end of a water faucet and the clip 19 is closed, as shown in the dotted lines in Fig. 1, and the water in the faucet 12 may be turned on. It is contemplated that the flexible tube 15 may be several feet long so that the user is not required to use the mixture in the proximity of the faucet. The pressure in the tube 15 will force the spring pressed relief valve open to relieve the pressure therein and permit the water to flow out through the valve 20 until the user is ready to actually use the syringe or injector.

When the user is ready to use the syringe or injector, at a distance from the faucet, the clip 19 is opened, thus permitting water, under pressure, to flow into the inlet tube 16. The water, as it flows out of the lower end of the inlet tube, will strike against the head 37 on the top of the vertically extending part of the lever 34, and will cause the lever 34 to swing downwardly on its pivotal mounting 35, to assume a position shown by the dotted lines in Fig. 1. Thus, the conical head 38, on the horizontal part of the lever 34, is moved downwardly, thereby opening the channel 31 permitting the liquid to flow therethrough into the mixing reservoir 11, at a rate governed by the position of valve stem 26. As soon as the flow of water in the inlet tube 16 is cut off, either by shutting off the faucet 12, or by the squeezing together of the sides of the flexible tube 15 by the clip 19, the coil spring 36 will return the lever 34 to its normal position shown in full lines in Fig. 1, thus preventing any further flow of the liquid from the solution reservoir 21. When the clip 19 is closed, while the water in the faucet 12 is still turned on, the relief valve 20 will be forced open by the built up pressure, thus permitting the water to flow therethrough and prevent the bursting of the tube 15.

It has been found that best results are secured, by adjusting the parts, so that the top of the admixture in the mixing reservoir 11 is at the level marked "L".

It will be apparent to one skilled in art that the invention, herein disclosed, may be variously changed, used or modified, without departing from the spirit of the invention, or sacrificing the advantages thereof, and that the embodiment of the invention, herein shown, is illustrative only, and that the invention is not limited thereto.

What is claimed is:

1. An automatic mixing device comprising a closed mixing reservoir, a solution reservoir within the mixing reservoir having an aperture in communication with the mixing reservoir, flexible conduit means secured to the mixing reservoir at one end and adapted at the other end to be fitted over a plug supplying liquid under pressure to the mixing reservoir, means for shutting off the flow of liquid in said conduit, conduit means for conducting mixed liquid away from the mixing reservoir, and means controlled by the flow of liquid into the mixing reservoir for opening and closing said aperture in the solution reservoir.

2. An automatic mixing device comprising a closed mixing reservoir, a solution reservoir within the mixing reservoir having an aperture in communication with the mixing reservoir, flexible conduit means secured to the mixing reservoir at one end and adapted at the other end to be fitted over a plug supplying liquid under pressure to the mixing reservoir, means for shutting off the flow of liquid in said conduit, a relief valve between said shut off means and said plug, conduit means for conducting mixed liquid away from the mixing reservoir, and means controlled by the flow of liquid into the mixing reservoir for opening and closing said aperture in the solution reservoir.

3. An automatic mixing device comprising a closed mixing reservoir, a solution reservoir within the mixing reservoir having an aperture in communication with the mixing reservoir, flexible conduit means secured to the mixing reservoir at one end and adapted at the other end to be fitted over a plug supplying liquid under pressure to the mixing reservoir, means for shutting off the flow of liquid in said conduit, conduit means for conducting mixed liquid away from the mixing reservoir, and means controlled by the flow of liquid into the mixing reservoir for opening and closing said aperture in the solution reservoir, said control means normally closing said aperture but movable away from said aperture by the flow of liquid into the mixing reservoir to permit liquid to flow from the solution reservoir to the mixing reservoir.

4. An automatic mixing device comprising a closed mixing reservoir, a solution reservoir within the mixing reservoir having an aperture in communication with the mixing reservoir, flexible conduit means secured to the mixing reservoir at one end and adapted at the other end to be fitted over a plug supplying liquid under pressure to the mixing resevoir, means for shutting off the flow of liquid in said conduit, conduit means for conducting mixed liquid away from the mixing reservoir, a lever having a free end in line with the flow of liquid under pressure and normally resting against the end of the supply conduit, but movable therefrom by the flow of liquid from said conduit, and closure means mounted on said lever controlling the flow of liquid through the aperture in the solution reservoir.

5. An automatic mixing device comprising a closed mixing reservoir, a solution reservoir within the mixing reservoir having an aperture in communication with the mixing reservoir, flexible conduit means secured to the mixing reservoir at one end and adapted at the other end to be fitted over a plug supplying liquid under pressure to the mixing reservoir, means for shutting off the flow of liquid in said conduit, conduit means for conducting mixed liquid away from the mixing reservoir, a lever having a free end in line with the flow of liquid under pressure and normally resting against the end of the supply conduit, but movable therefrom by the flow of liquid from said conduit, means for returning said lever to its normal position when the flow of liquid is cut off, and closure means mounted on said lever controlling the flow of liquid through the aperture in the solution reservoir.

6. An automatic mixing device comprising a closed mixing reservoir, a solution reservoir within the mixing reservoir having an aperture in communication with the mixing reservoir, valve means operable from the outside of the mixing reservoir for regulating the flow of liquid out of the aperture into the mixing reservoir, a flexible conduit means secured to the mixing reservoir at one end and adapted at the other end to be fitted over a plug supplying liquid under pressure to the mixing reservoir, means for shutting off the flow of liquid in said conduit, conduit means for conducting mixed liquid away from the mixing reservoir, and means controlled by the flow of liquid into the mixing reservoir for opening and closing said aperture in the solution reservoir.

7. An automatic mixing device comprising a closed mixing reservoir, a solution reservoir within the mixing reservoir having an aperture in communication with the mixing reservoir and a vent, valve means operable from the outside of the mixing reservoir for regulating the flow of liquid out of the aperture into the mixing reservoir, a flexible conduit means secured to the mixing reservoir at one end and adapted at the other end to be fitted over a plug supplying liquid under pressure to the mixing reservoir, means for shutting off the flow of liquid in said conduit, conduit means for conducting mixed liquid away from the mixing reservoir, and means controlled by the flow of liquid into the mixing reservoir for opening and closing said aperture in the solution reservoir.

8. An automatic mixing device comprising a closed mixing reservoir, a solution reservoir within the mixing reservoir having an aperture in communication with the mixing reservoir, flexible conduit means secured to the mixing reservoir at one end and adapted at the other end to be fitted over a plug supplying liquid under pressure to the mixing reservoir, means for shutting off the flow of liquid in said conduit, a relief valve between said shut off means and said plug, conduit means for conducting mixed liquid away from the mixing reservoir, and means controlled by the flow of liquid into the mixing reservoir for opening and closing said aperture in the solution reservoir, said control means normally closing said aperture but movable away from the aperture by the flow of liquid into the mixing reservoir to permit liquid to flow from the soluton reservoir to the mixing reservoir.

9. An automatic mixing device comprising a closed mixing reservoir, a solution reservoir within the mixing reservoir having an aperture in communication with the mixing reservoir, flexible conduit means secured to the mixing reservoir at one end and adapted at the other end to be fitted over a plug supplying liquid under pressure to the mixing reservoir, means for shutting off the flow of liquid in said conduit, a relief valve between said shut off means and said plug, conduit means for conducting mixed liquid away from the mixing reservoir, a lever having a free end in line with the flow of liquid under pressure and normally resting against the end of the conduit supplying liquid under pressure but movable therefrom by the flow of liquid from the said conduit, and closure means mounted on said lever controlling the flow of liquid from the aperture in the solution reservoir.

10. An automatic mixing device comprising a closed mixing reservoir, a solution reservoir within the mixing reservoir having an aperture in communication with the mixing reservoir, flexible conduit means secured to the mixing reservoir at one end and adapted at the other end to be fitted over a plug supplying liquid under pressure to the mixing reservoir, means for shutting off the flow of liquid in said conduit, a relief valve between said shut off means and said plug, conduit means for conducting mixed liquid away from the mixing reservoir, a lever having a free end in line with the flow of liquid under pressure and normally resting against the end of the conduit supplying liquid under pressure but movable therefrom by the flow of liquid from the said conduit, means for returning said lever to its normal position when the flow of liquid is cut off, and closure means mounted on said lever controlling the flow of liquid from the aperture in the solution reservoir.

11. An automatic mixing device comprising a closed mixing reservoir, a solution reservoir within the mixing reservoir having an aperture in communication with the mixing reservoir, valve means operable from the outside of the mixing reservoir for regulating the flow of liquid out of said aperture into the mixing reservoir, a flexible conduit means secured to the mixing reservoir at one end and adapted to be fitted over a plug supplying liquid under pressure to the mixing reservoir, means for shutting off the flow of liquid in said conduit, a relief valve between said shut off means and said plug, conduit means for conducting mixed liquid away from the mixing reservoir, and means controlled by the flow of liquid into the mixing reservoir for opening and closing said aperture in the solution reservoir.

12. An automatic mixing device comprising a closed mixing reservoir, a solution reservoir within the mixing reservoir having an aperture in communication with the mixing reservoir and a vent, valve means operable from the outside of the mixing reservoir for regulating the flow of liquid out of said aperture into the mixing reservoir, a flexible conduit means secured to the mixing reservoir at one end and adapted to be fitted over a plug supplying liquid under pressure to the mixing reservoir, means for shutting off the flow of liquid in said conduit, a relief valve between said shut off means and said plug, conduit means for conducting mixed liquid away from the mixing reservoir, and means controlled by the flow of liquid into the mixing reservoir for opening and closing said aperture in the solution reservoir.

DANIEL R. MURRAY.